United States Patent [19]

Lei

[11] Patent Number: 5,767,497
[45] Date of Patent: Jun. 16, 1998

[54] METHOD AND APPARATUS FOR DECODING BAR CODE SYMBOLS USING RATIO ANALYSIS OF MODULE SIZE

[75] Inventor: Ming Lei, Norwood, Mass.

[73] Assignee: United Parcel Service of America, Inc., Atlanta, Ga.

[21] Appl. No.: 759,402

[22] Filed: Dec. 4, 1996

[51] Int. Cl.⁶ ........................................ G06K 7/10
[52] U.S. Cl. ................................... 235/462; 235/463
[58] Field of Search ............................ 235/462, 463, 235/470, 472, 494

[56] References Cited

U.S. PATENT DOCUMENTS

| | | | |
|---|---|---|---|
| 4,578,570 | 3/1986 | Mazumder et al. | 235/463 |
| 5,184,005 | 2/1993 | Ukai et al. | 235/462 |
| 5,302,814 | 4/1994 | Kawabata | 235/463 |
| 5,319,181 | 6/1994 | Shellhammer et al. | 235/462 |
| 5,326,961 | 7/1994 | Sibata | 235/463 |
| 5,329,105 | 7/1994 | Klancnik et al. | 235/462 |
| 5,331,141 | 7/1994 | Kaneko | 235/462 |
| 5,343,028 | 8/1994 | Figarella et al. | 235/462 |
| 5,352,878 | 10/1994 | Smith et al. | 235/462 |
| 5,393,968 | 2/1995 | Watanabe et al. | 235/462 |
| 5,412,196 | 5/1995 | Surka | 235/462 |
| 5,539,191 | 7/1996 | Ackley | 235/470 |
| 5,550,365 | 8/1996 | Klancnik et al. | 235/462 |
| 5,553,084 | 9/1996 | Ackley et al. | 235/437 |
| 5,608,200 | 3/1997 | Le Goff et al. | 235/462 |
| 5,635,697 | 6/1997 | Schellhammer et al. | 235/470 |
| 5,675,137 | 10/1997 | Van Haagen et al. | 235/463 |

FOREIGN PATENT DOCUMENTS

| | | |
|---|---|---|
| 0 164 012 | of 1985 | European Pat. Off. . |
| 0 353 842 | of 1990 | European Pat. Off. . |
| 0 449 634 A2 | of 1991 | European Pat. Off. . |
| 55-20585 | of 1980 | Japan . |

*Primary Examiner*—Donald T. Hajec
*Assistant Examiner*—Jacob Eisenberg
*Attorney, Agent, or Firm*—Jones & Askew, LLP

[57] ABSTRACT

A method and apparatus for decoding bar code symbols using an analysis of the ratios of the module size for the bars and spaces of the bar code. The invention is applicable to any bar code having one or more nominal widths in the bars and spaces, and is particularly useful in bar codes having multiples widths in the specification for the bar code and in situations where the bar code signal has a low signal-to-noise ratio, or is degraded because of a damaged, smudged, or dirty bar code, or where the bar code is read at less than the optimum angle. The invention identifies mis-decoded characters and uses adaptive techniques to decode characters previously non-decodable or mis-decoded by standard methods, thereby improving the decode rate as compared to prior techniques. The decoding rate is improved without having to re-scan the bar code for a new signal, thereby making the invention particularly useful for high-speed or one-pass decoding operations.

15 Claims, 5 Drawing Sheets

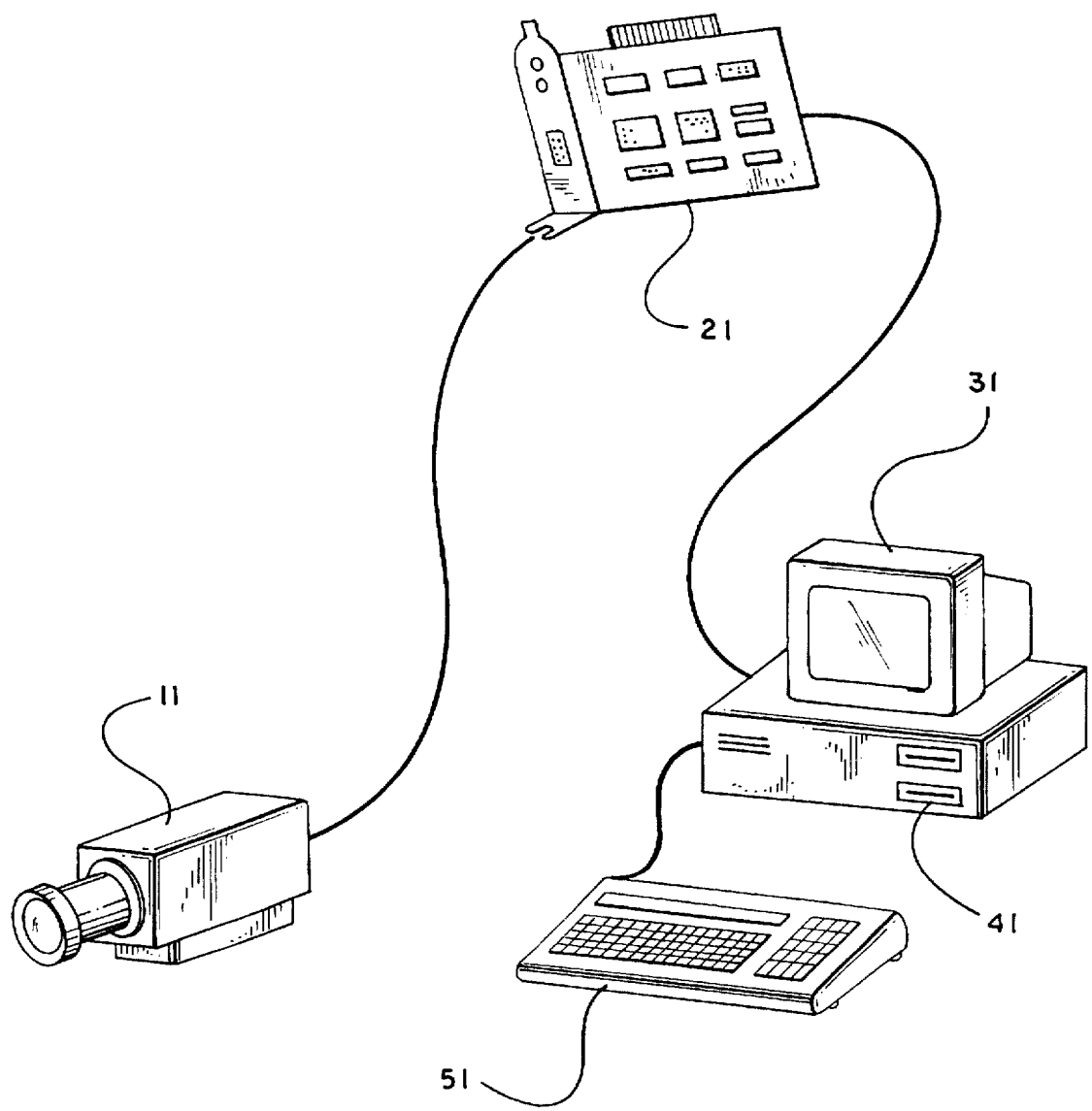
Fig_4

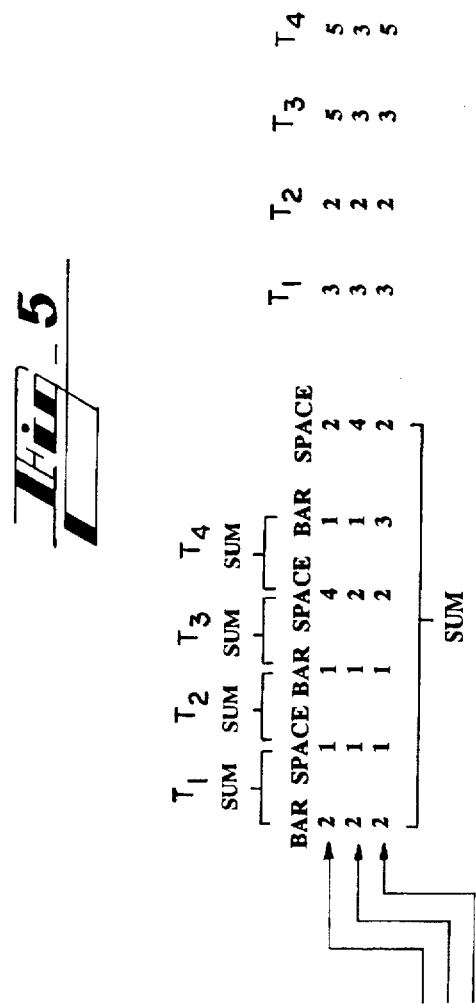

METHOD AND APPARATUS FOR DECODING BAR CODE SYMBOLS USING RATIO ANALYSIS OF MODULE SIZE

FIELD OF THE INVENTION

This invention is an improved method and apparatus for decoding bar code symbols, and in particular for decoding bar code symbols where the bars and spaces are nominally in one or more specific, constant ratios to a basic module width.

BACKGROUND OF THE INVENTION

Bar code decoding is the process of taking a one dimensional signal, either directly collected from a laser scanner, a one dimensional image sensor, or sampled from a 2-D image from an imaging device, and interpreting the signal to extract the information in the bar code symbol. Typically, the information in the bar code is a series of alpha-numeric or special characters. A bar code consists of a sequence of characters and is decoded by decoding each character in sequence as it appears in the bar code. A successful decode solely relies on the correct decode of each individual character. Some bar code symbologies, such as Code 128, described in U.S. Pat. No. 5,329,105, which patent is incorporated herein by reference, have checksum characters encoded in the symbols which are used to detect the occurrence of a mis-decode of the bar code symbol. The checking is done after all the characters have been decoded.

Currently, most decoding methods work well when the signal is of reasonably good quality. However, if a signal has low signal-to-noise ratio or low resolution, or is contaminated by noise, distorted due to scanning angle, then current methods tend to fail to decode the character(s) in the distorted signal segment. Remedying the failure is attempted by collecting (or sampling) a new signal for the bar code rather than working with the existing signal. These prior art techniques have not caused major problems in situations where hand-held scanners are used, because a second scan is easy to request and receive. However, for continuous processes using, e. g., over-the-belt bar code scanners, even if sampling the same symbol many times is possible, applying the same technique to different signals many times or combining these signals together does not guarantee a successful decoding of the symbol.

Bar codes are typically a series of dark and light elements, herein after referred to as "bars" and "spaces". Furthermore, widths of the elements in most kinds of bar codes are nominally in certain fixed ratios to a fundamental, usually minimum, width, which will be called herein the "unit module." In the specification for some kinds of bar codes, the width of the unit module can differ by element type; i.e., the width of the unit module for a bar is a different from the width of the unit module for a space. Frequently, for a given kind of bar code, the bar code specification will require all of the characters to have the same number of unit modules.

Many current decoding methods have been designed for bar codes consisting of only two element widths, namely "wide" and "narrow". In this situation, a "narrow" element usually corresponds to the unit module for that element and the width of the "wide" element is some multiple of the unit module width. In addition to these kinds of bar codes, there are more complicated kinds of bar codes with more than two element widths. Code 128, for example, has four different element widths. Multiple widths are more difficult to identify correctly in any bar decoding technique, particularly when the bar code signal is noisy or degraded in other ways,
or the bar code is dirty, printed on glossy stock, torn or overprinted, or read at an angle across the bar code.

Different types of problems are dealt with differently by prior art techniques. If there is any noisy data in the digital signal, a character may not be decodable in the sense that the decode result does not match any pre-defined encodation patterns (called herein a "non-decodable character"). If this happens, the prior art techniques recognize the error immediately but will thereafter discard the signal and attempt to collect a new signal. A more serious problem is that a character may be decoded into a pattern which does not correspond the originally encoded one (called herein a "mis-decoded character"). The error cannot be detected by the prior art until the checksum, if any, is computed at the end of all the characters. If there is no checksum, an undetected mis-decode occurs. If there is a checksum, time is wasted in processing all of the characters before the mis-decode can be detected. As indicated above, the usual fix is to try another scan signal. If the same problem persists with the new signal, which is usually the case for many applications such as the over-the-belt scanning, the bar code itself is non-decodable irrespective of the multiple scans.

The time that is wasted pending checksum analysis and re-scanning where errors are detected is a serious problem for high-speed continuous operations, such as reading labels on packages by automatic means. In this type of application, where the packages can be moving on a conveyor belt at speeds up to 500 feet per minute, and the bar codes on the packages must be read (usually by fixed readers mounted over the conveyor belt) in real time to enable automatic routing on the conveyor system, it has been found that the new method significantly improves one pass read rate as well as overall read rate for effective high speed automatic conveyor sorting using the aforementioned code 128. While this method is equally applicable to most bar code symbologies, it is particularly useful for bar codes with multiple widths such as UPC/EAN, code 49, code 93, code 16K, as well as PDF 417, etc.

Some attempts to use averages and width ratios in bar code analysis have appeared in the literature. For example, U.S. Pat. No. 5,331,141, entitled "Bar Code Reader and Game Set Using the Same," issued Jul. 19, 1994 to Kaneko, discloses an apparatus for reading bar codes from cards by measuring the time intervals of black or white reflectance levels as the bar code is slid past a reading head. In col. 10, line 59 through col. 11, line 19, and FIG. 10, the patent discloses the method of computing the ratio $\alpha$ of the "width of the black bar to the width of the white bar in the guard bar" (col. 10, lines 60–61). The ratio a is computed once and then all white bars are multiplied by $\alpha$ to normalize the widths and correct for expansion or contraction (distortion of the width) of each of the bars in the bar code data. This patent, however, discloses none of the adaptive techniques disclosed in this specification, nor is there any teaching concerning the savings of time by recognizing mis-decoded characters by ratio analysis prior to checksum analysis.

U.S. Pat. No. 5,393,968, entitled "Method and Device for Reading Bar Code," issued Feb. 28, 1995 to Watanabe, et al. discloses a bar code reader employing a type of ratio analysis to detect likely errors in decoding. As discussed in col. 12, line 54 through col. 13, line 32 of this patent, character length ratios for successive characters in a bar code are computed to measure the amount of distortion of a bar code. If the character length ratios differ by more than a predetermined allowable amount, suggested in the patent as ±15%, the bar code is re-read. No averaging technique is employed as taught by this specification, nor is there any adaptive technique as disclosed in this specification, and no attempt is made to correct the existing bar code data rather than re-read the bar code.

Thus, there is a need for a method and apparatus which can successfully decode complex bar codes, employing more than two module widths and which can operate at a rate to decode symbols for modern continuous process, such as sorting packages by label information.

SUMMARY OF THE INVENTION

The present invention seeks to provide an improved system and method for successfully decoding complex bar codes employing more than two module widths, for detecting mis-decoded characters and re-decoding same, and for successfully decoding more characters that are non-decodable using conventional decoding methods without the necessity of re-scanning the bar code.

In accordance with the invention, this object is accomplished by comparing average module widths based on a start or stop character to average module widths of a decoded character to determine whether the character has been acceptably decoded, and further to re-decode mis-decoded characters by applying decoding methods to a sequence of integers derived from the element widths divided by the appropriate average module width.

Generally described, the invention provides a system and method for decoding a bar code of the type including a start code and a stop code, each character of the bar code being represented by a series of elements comprising bars and spaces, the width of each such element being a multiple of a unit bar module width or a unit space module width, comprising the steps of:

(a) scanning a bar code and assigning a value to the width of each element encountered in the scan;

(b) decoding a start or stop character of the bar code;

(c) calculating a first average unit bar module width by dividing the sum of the bar widths of the start or stop character by a known number of bar unit modules in the start or stop character;

(d) calculating a first average unit space module width by dividing the sum of the space widths of the start or stop character by a known number of space unit modules in the start or stop character;

(e) decoding a second character of the bar code;

(f) if the attempt to decode the second character fails, marking the second character as non-decodable;

(g) if the attempt to decode the second character succeeds, calculating a second average unit bar module width by dividing the sum of the bar widths of the second character by a known number of bar unit modules in the second character, and continuing with steps (h)–(j);

(h) calculating a second average unit space module width by dividing the sum of the space widths of the second character by a known number of space unit modules in the second character;

(i) accepting the decoding of the second character if the ratio of the second to the first average unit bar module widths is within a predetermined tolerance of 1:1, and the ratio of the second to the first average unit space module widths is within a predetermined tolerance of 1:1; and (j) marking the second character as mis-decoded if the ratios are outside the predetermined tolerance.

Attempts can then be made to decode the other characters in the bar code, and running averages of the unit module widths calculated based on the accepted characters. Characters marked as non-decodable or mis-decoded can be further processed without re-scanning the bar code by dividing the width of each bar element by a final running average unit bar module width, and the width of each space element by a final running average unit space module width, to obtain a series of quotients; rounding the quotients obtained to the closest integer; decoding the series of integers to obtain a new character; calculating a new character average unit bar module width by dividing the sum of the bar widths of the one character by a known number of bar unit modules in the new character; calculating a new character average unit space module width by dividing the sum of the space widths of the one character by a known number of space unit modules in the new character, accepting the decoding of the one character as the new character if the ratio of the new character to final running average unit bar module widths is within a predetermined tolerance of 1:1, and the ratio of the new character to final average unit space module widths is within a predetermined tolerance of 1:1.

If there is a bad or damaged area between the edges of the bar code, the invention provides a method of decoding beginning at each end of the bar code toward the bad area.

The major components of an embodiment of a system according to the invention are a signal collecting device, typically a CCD camera or laser scanner, a signal processing module, consisting of an A/D converter and a CPU and memory, and an output device such as a terminal or a communication link to other devices. The signal processing module converts the analog signal from the collecting device to digital form, and the widths of the bars and spaces are measured by the CPU. The output, typically numbers, representative of those widths are used in the method of the invention which is programmed into the processor for decoding. The decoding result may be output to a terminal or a controller, depending on the particular application.

The system of the invention is operative to carry out a method to decode a bar code of a known kind, wherein the bar code is comprised of a number of characters in an order, each character of which is represented by a series of alternating bar and space elements. The width of each element in the series is in one of a plurality of fixed ratios to a unit module width corresponding to the element type, the plurality of fixed ratios being determined by the particular kind of the bar code being decoded. The method steps may be more particularly described as (a) scanning the bar code and assigning a value to the width of each element encountered in the scan; (b) determining the particular kind of the bar code by decoding start/stop characters; (c) determining an average bar code module width for each element type from the start or stop character depending on scanning direction; (d) grouping the width values into ordered sets corresponding to the order of the characters in the bar code; (e) comparing the width values in the ordered set next in order to a table of standard character values for the particular kind of bar code; and (f)(i) if no match is found, marking the ordered set as non-decodable; or (f)(ii) if a match is found, subjecting the width values of the matching character to ratio analysis, and if the ratio analysis is unsuccessful, marking the ordered set as mis-decoded; and if the ratio analysis is successful, updating the average unit module width corresponding to each element type; (g) repeating step (f) above until the last character is processed; and (h) attempt to decode the marked ordered set using the average unit module width.

This invention uses adaptive techniques to improve the accuracy, speed and efficiency of bar code character decoding.

This invention can correct character mis-decodes without resort to checksum analysis.

This invention can identify character mis-decodes quickly and decodes them properly without the necessity of re-scanning the bar code.

This invention uses the specification of the type of bar code being read to monitor the kinds of elements in a character set to ensure that the decoded character has the proper number of elements, the proper number of each type of element, and the proper number of unit module widths.

The technique of this invention processes the bar code scanning signal in a thorough way and utilizes the knowledge of the specification and of the signal processing in the decoding. For a regular signal, the technique of the invention may reduce to standard reference decode techniques. However, if a signal is of low quality, the invention improves the decoding process significantly with the least amount of extra processing.

The invention identifies mis-decoded characters and uses adaptive techniques to decode characters previously non-decodable or mis-decoded by standard methods, thereby improving the decode rate as compared to prior techniques. The decoding rate is improved without having to re-scan the bar code for a new signal, thereby making the invention particularly useful for high-speed or one-pass decoding operations.

BRIEF DESCRIPTION OF THE DRAWINGS

FIG. 4 is a block diagram of the major components of an embodiment of the present invention.

FIG. 5 is a portion of a table of bar code encodation patterns for a code 128 bar code (prior art).

DETAILED DESCRIPTION

Figure 1:
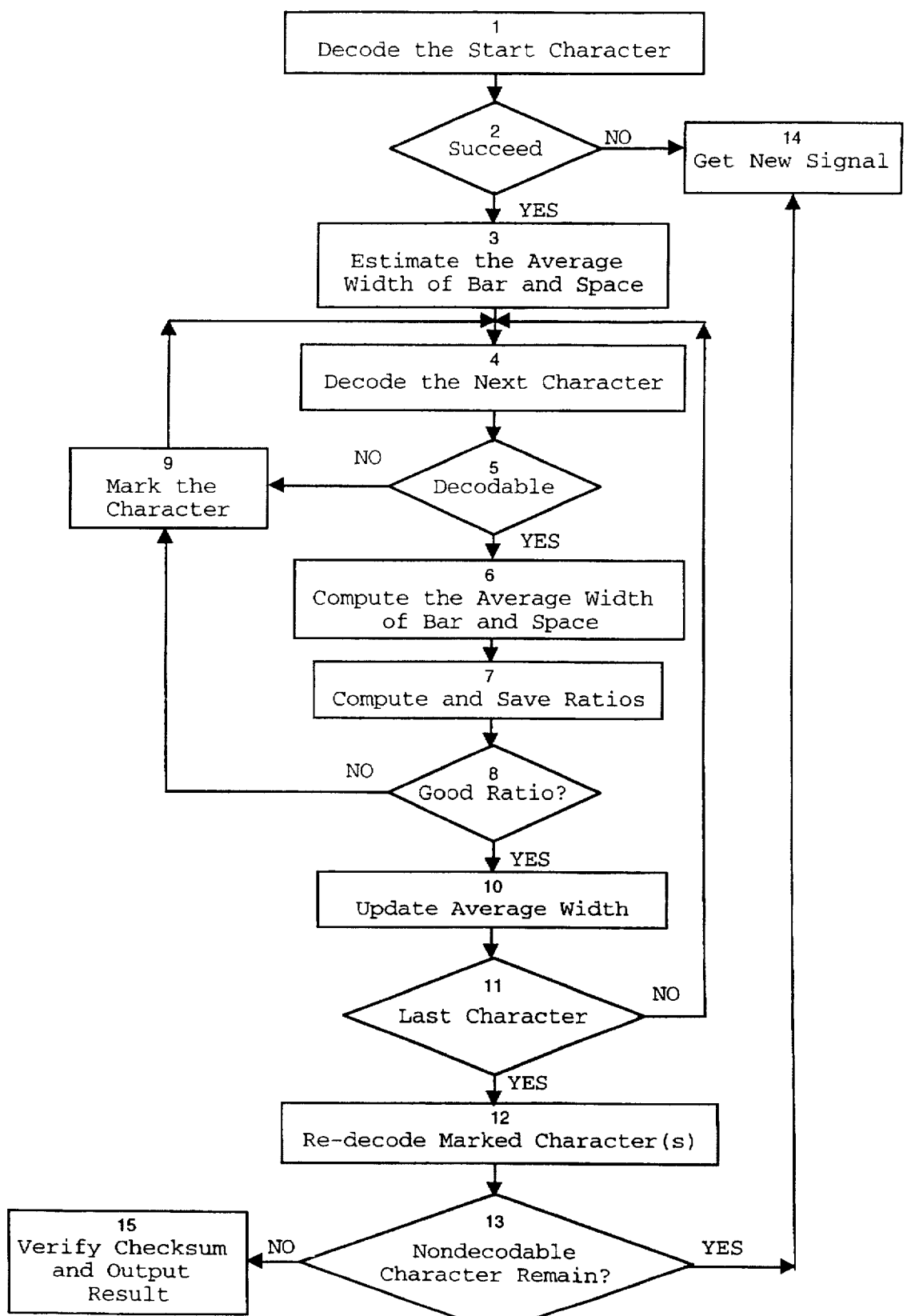
FIG. 1 is a flow chart of an embodiment of the present invention depicting the overall method of decoding a bar code beginning with the start character and ending with the check sum.

With reference to FIG. 1, an embodiment of the method of the present invention may be described in terms of its overall flow. First the method decodes characters by means of a known decoding algorithm available for the particular types of bar codes which are being processed. The decoding starts when a start character is detected in block 1. If a start character is decoded using standard reference decode algorithms, then success is declared in block 2 and the process continues with block 3. If no start character is found the process proceeds to block 14, wherein the invention acquires a new scan or new signal representative of the bar code symbol. In essence, block 14 is a declaration that the method is unable to decode the bar code with the present information.

Returning back to block 3, there is an initial estimate of the running average width of a one-module bar and a one-module space in the bar code. (A one-module bar is sometimes abbreviated herein as a "1X bar", and a one-module space is sometimes abbreviated herein as a "1X space".) Next there begins a character-by-character loop beginning with block 4, which is to decode the next character. Initially, the next character is the character after the start character. This decoding technique also uses the reference decode algorithm available for the particular types of bar codes being processed. A decision is made whether the character has been successfully decoded with the available technique in block 5. If the character has been successfully decoded, the invention continues into block 6. If the available technique is unable to decode the present character, this character is marked as non-decodable in block 9 and processing returns to block 4 to decode the next character.

Returning now to block 6, the average widths of bar and space of the successfully decoded character are computed. In block 7, the average width of bar is divided by the aforementioned running 1X bar width to derive the ratio of bar. The ratio of space is similarly computed. The two ratios for the character are saved for future use. Since the 1X width should not deviate between characters, the ratio is normally close to 1. In block 8, the ratio is checked to see if it is within certain percentage threshold, say, 30% of deviation from 1. That is, a good ratio should have a value between 0.7 and 1.3. If the ratios are not good the character is marked as a mis-decoded character and processing returns back through block 9 to block 4 to decode the next character. However, in block 8 if the ratios are good, the 1X widths of the character are used to update the running average width being maintained by the program for a 1X bar and a 1X space in the bar code Next a test is made to see if the last character has been processed, and if not processing returns back to block 4 to decode the next character.

Once all the characters of the bar code have been processed, the running average widths become the overall average widths which are estimates based on decoded characters. Then all of the characters which have been marked as non-decodable or mis-decoded are re-decoded in block 12. This process is further explained in FIG. 2. Processing then returns to see if there are any non-decodable characters remaining after the re-decoding process. If so, processing moves to block 14, where an overall lack of success is declared and a new signal is acquired as was done if the method had unable to detect a start character. Otherwise, if there are no non-decodable characters remaining, the check sum is verified and the results are output.

Figure 2:
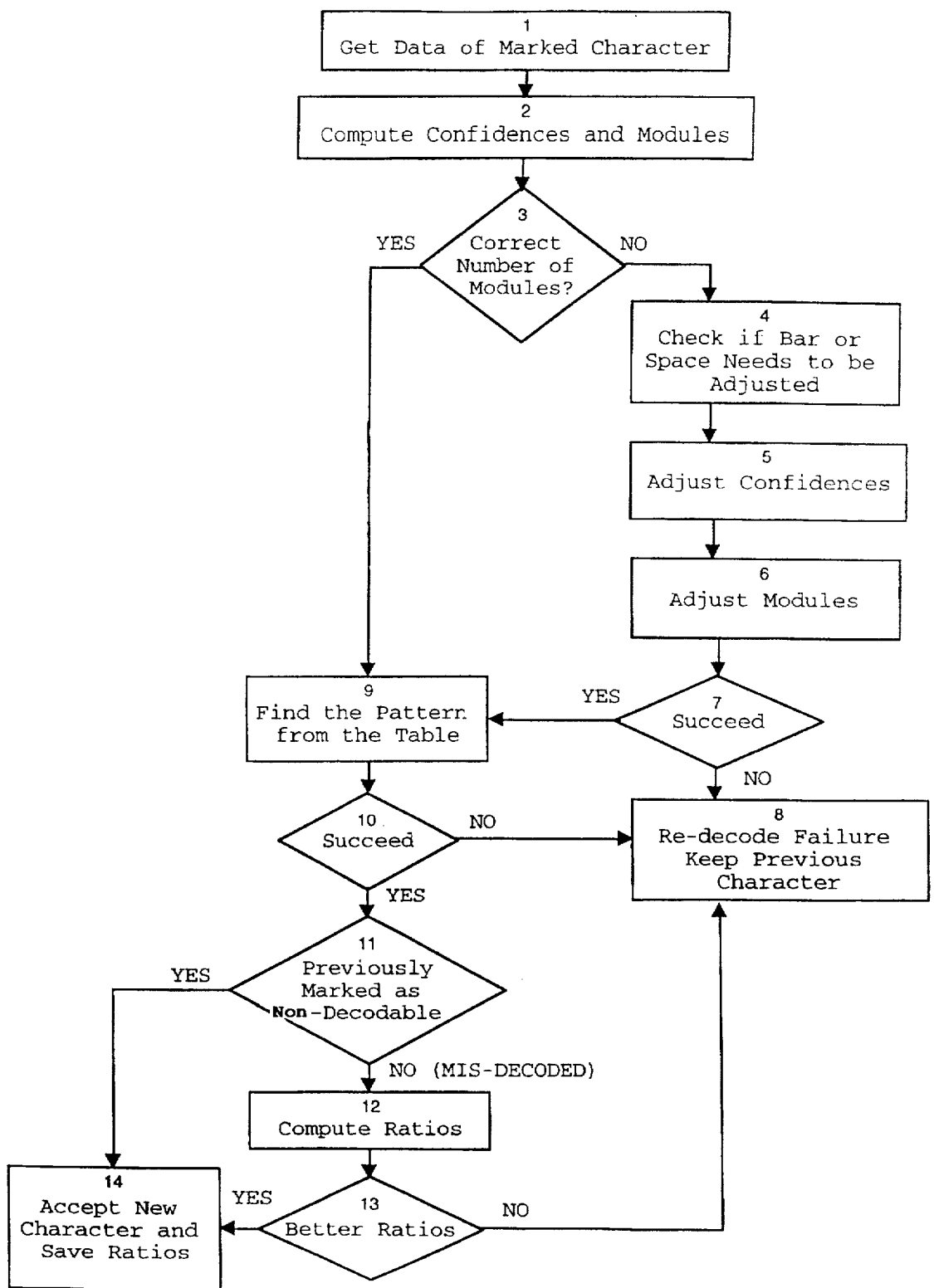
FIG. 2 is a flow chart of an embodiment of the present invention depicting re-decode aspect of the present invention.

Turning now to FIG. 2, there is illustrated the overall flow for re-decoding marked characters for one embodiment of the present invention. This process is entered after attempts have made to decode all characters and certain of the characters have marked as either non-decodable or mis-decoded. The process of FIG. 2 will be executed for each such character marked. The first step, in block 1 of FIG. 2, is to get the data of the marked character, the data being the widths of the bars and spaces. Next, in block 2, the number of modules and the confidences in the number of modules are computed. In block 3, a test is made as to whether a correct number of modules has been computed for the specification for the particular type of bar code being decoded. If so, processing continues with block 9. If not, processing continues with block 4 and a check is made to see which bar or space needs to be adjusted to obtain the correct number of modules. This is done by processing in block 5, where the confidences are adjusted and in block 6, where finally, the number of modules of one or more of the bar or space widths is adjusted.

Having made adjustments to the number of modules of one or more of elements on the bar code symbol data, a test is made in block 7 as to whether the adjustments have succeeded in providing the correct number of modules for a character of the bar code. If so, processing continues in block 9. If not, processing proceeds to block 8, where a failure to re-decode is announced and the best estimate for the character previous available is kept. In block 9, having the correct number of modules, a table look-up process is performed to test whether a character exists corresponding to the encodation pattern of the modules. In block 10, if the test fails, processing proceeds to block 8, where a failure is declared. If success is achieved, and if the character is previously marked as non-decodable, as tested in block 11, then processing continues with block 14, where the newly decoded character is accepted. If the character is marked as mis-decoded, as tested in block 11, then processing continues with block 12, where the ratios of the widths of the character to the overall average widths are computed. The ratios are then compared with those saved in the first decoding attempt for the character to see whether they are better in the sense that if they are closer to 1. If the ratios are not better, then a failure is declared and processing continues in block 8. If better ratios are declared, then processing continues with block 14, where a success is declared. The new character that has been decoded is accepted. In doing so, even if a correctly decoded character was wrongly classified as a mis-decoded one in the first decode attempt, it will not be replaced by a re-decoded character unless the re-decoded one has better ratio factor. This also suggests that the aforementioned percentage threshold for ratio analysis can be set at different values without causing adverse effect. For signals where mis-decode is prone to occur, the percentage threshold can be chosen so that the ratio is not allowed to deviate from 1 by a large margin.

For a bi-directional decodable bar code, the process in FIG. 1 can also begin with the stop character and continue with the next character.

The method of the present invention can be further described by a series of examples, all characters of which are based on Code 128 symbology. Code 128 characters have six elements per character (alternating bars and spaces, 3 of each) and the sum of the module widths is specified to be eleven for each character. The standard decoding method for Code 128 symbology is disclosed in U.S. Pat. No. 5,329,105 (the "105 patent").

EXAMPLE 1

After the bar code symbol of this example is scanned, the widths of the bars and spaces forming a character are represented by a series of ordered character sets, each ordered character set has six numbers, and each number is a measure of the corresponding element width:

```
420  104  147  217  220  529| 216  233  552  217  326  931| 566  76  294  388  200  128|364  240...
       1st character              2nd character                    3rd character
```

The '105 patent teaches an "edge-to-edge" technique, which can be used to decode each set of six numbers.

1st character. The first set is 420 104 147 217 220 529

The method first checks to see if this is a start character (a stop character or other initialization character could also be used). The standard edge-to-edge technique generates a four-integer sequence, denoted by $t_1 t_2 t_3 t_4$. Using this technique, where the symbol "→" means "round to nearest integer", we have:

$$x = \frac{1}{11}(420 + 104 + 147 + 217 + 220 + 529) = 148.82$$

$$t_1 = \frac{1}{x}(420 + 104) = 3.52 \rightarrow 4$$

$$t_2 = \frac{1}{x}(104 + 147) = 1.69 \rightarrow 2$$

$$t_3 = \frac{1}{x}(147 + 217) = 2.45 \rightarrow 2$$

$$t_4 = \frac{1}{x}(217 + 220) = 2.94 \rightarrow 3$$

$$t_1 t_2 t_3 t_4 = 4223.$$

Unlike prior art techniques, the present invention does not require the decoded result "4223" to match one of the three start patterns, but only to be close in a goodness-of-fit test. The distance between "4223" and the three start codes is therefore tested (refer to FIG. 5 for start patterns):

$$\text{Distance to start code } A = d_1^2 = (4-3)^2 + (2-2)^2 + (2-5)^2 + (3-5)^2 = 14$$

$$\text{Distance to start code } B = d_2^2 = (4-3)^2 + (2-2)^2 + (2-3)^2 + (3-3)^2 = 2$$

$$\text{Distance to start code } C = d_3^2 = (4-3)^2 + (2-2)^2 + (2-3)^2 + (3-5)^2 = 6$$

The code "4223" is closest to start code B whose value is "104". For code 128, "104" is accepted as the start code only if $d^2 < 3$ to prevent selecting a wrong start code.

The above special treatment applies only to characters such as start codes and stop codes. For any other character, between the start and stop codes, its candidate set (usually stored in an encodation table) is too big and the result determined from the minimum distance is not always correct. Thus, a more rigorous analysis is made.

After the start code is decoded, we know it has the following pattern from the encodation table:

| bar | space | bar | space | bar | space |
|-----|-------|-----|-------|-----|-------|
| 2   | 1     | 1   | 2     | 1   | 4     |

There are a total of 4 bar modules and 7 space modules. By looking at the original width data 420 104 147 217 220 529

The summation of bar widths 420+147+220=787
The summation of space widths is 104+217+529=850 so the 1X bar module is estimated as $$\frac{787}{4} = 196.75 \quad \text{(average width of 1X bar)}$$

$$\frac{850}{7} = 121.43 \quad \text{(average width of 1X space)}$$

Therefore, we have initial estimate of a 1X bar and space $(X_B, X_S) = (196.75, 121.43)$.

2nd character. We now decode the second code word, also using the edge-to-edge technique:

216 233 552 217 326 93   $t_1t_2t_3t_4 = 3554$

From encodation table, 3554 matches value "17". It has the following pattern:

| bar | space | bar | space | bar | space |
|---|---|---|---|---|---|
| 1 | 2 | 3 | 2 | 2 | 1 |

Number of bar modules=6

Number of space modules=5

1X bar module=(216+552+326)/6=1094/6=182.33

1X space module=(233+217+93)/5=543/5=108.60

To verify the correctness of this decode, a ratio analysis is made. Ideally, the 1X bar and space should be close to those previously estimated:

ratio of bar width=182.33/196.75=0.93 ratio of space width=108.60/121.43=0.89

Since the ratios are close to 1.0, the value "17" is accepted as a correct value. At this moment, the running average 1X bar and space are updated as $$\frac{N*X_B + 182.33}{N+1} \text{ and } \frac{N*X_S + 108.60}{N+1}$$

Here N=1 and N+1=2, since we have successfully decoded two characters so far.

3rd character. We now decode the 3rd character using the edge-to-edge technique:

566  76  294  388  200  128   $t_1t_2t_3t_4 = 4254$

"4254" does not match any pattern in the encodation table. The character is marked as non-decodable. We will re-decode the character after edge-to-edge decoding of all the characters have been attempted.

We continue to decode the rest of characters using the standard edge-to-edge technique. When a character is successfully decoded (the ratios are close to 1.0), the running average 1X bar and space are updated. Completion of decoding all the characters results in final running average unit bar and unit space widths.

EXAMPLE 2

This example has 17 characters. The width data are as follows:

| value | bar | space | bar | space | bar | space | sum of bars | sum of spaces | # of bar modules | bar ratio | space ratio | mark |
|---|---|---|---|---|---|---|---|---|---|---|---|---|
| 104 | 420 | 104 | 147 | 217 | 220 | 529 | 787 | 850 | 4 | | | |
| 17 | 216 | 233 | 552 | 217 | 326 | 93 | 1094 | 543 | 6 | 1 | 2 | |
| -1 | 566 | 76 | 294 | 388 | 200 | 128 | 1060 | 592 | | | | N |
| 22 | 364 | 240 | 498 | 77 | 198 | 290 | 1060 | 607 | 6 | 1 | 0 | |
| 20 | 372 | 229 | 220 | 245 | 430 | 115 | 1022 | 589 | 6 | 1 | 0 | |
| 18 | 310 | 206 | 528 | 190 | 260 | 107 | 1098 | 503 | 6 | 0 | 2 | |
| 18 | 325 | 249 | 519 | 237 | 164 | 158 | 1008 | 644 | 6 | 1 | 1 | |
| 18 | 312 | 254 | 491 | 299 | 157 | 111 | 960 | 664 | 6 | 2 | 1 | |
| 25 | 504 | 235 | 176 | 118 | 349 | 237 | 1029 | 590 | 6 | 1 | 0 | |
| 99 | 211 | 101 | 564 | 76 | 702 | 77 | 1477 | 254 | 8 | 0 | 3 | M |
| 5 | 186 | 454 | 184 | 255 | 359 | 243 | 729 | 952 | 4 | 0 | 1 | |
| 2 | 324 | 278 | 371 | 274 | 328 | 150 | 1023 | 702 | 6 | 1 | 1 | |
| 37 | 195 | 392 | 344 | 115 | 182 | 431 | 721 | 938 | 4 | 0 | 1 | |
| 59 | 510 | 378 | 362 | 103 | 173 | 129 | 1045 | 610 | 6 | 0 | 0 | |
| 100 | 171 | 157 | 522 | 214 | 334 | 261 | 1027 | 632 | 8 | 3 | 7 | M |
| 98 | 695 | 77 | 189 | 421 | 219 | 94 | 1103 | 592 | 6 | 0 | 1 | |
| 109 | 368 | 391 | 529 | 80 | 183 | 136 | 1085 | 607 | 6 | 0 | 0 | |

Column 1 is the code word value decoded using edge-to-edge method. The number "-1" denotes a non-decodable, i.e., no matching entry can be found the encodation table. Column 10 is the number of bar modules corresponding to the codeword value in the encodation table. The number of modules can be inferred, (i.e., sum of all modules equals 11), therefore not listed. The last column marks the codeword as N (non-decodable) or M decoded).

The final running average widths are $X_B$=173 and $X_s$=120, estimated from 14 decoded characters not marked with "N" or "M". In this example, are three character number sets which are rejected from the first pass.

| -1 | 566 | 76 | 294 | 388 | 200 | 128 | 1060 | 592 | | | | N |
|---|---|---|---|---|---|---|---|---|---|---|---|---|
| 99 | 211 | 101 | 564 | 76 | 702 | 77 | 1477 | 254 | 8 | 0 | 3 | M |
| 100 | 171 | 157 | 522 | 214 | 334 | 261 | 1027 | 632 | 8 | 3 | 7 | M |

These are rejected because they failed to decode (denoted by -1), or the ratio is too far away from 1.0. (In the tables above, the bar "ratio" and the space "ratio" are represented in integer format because of the speed advantage of integer arithmetic. The number "3" actually means a deviation of 0.3 from 1.0. Therefore, the ratio may be 0.7 or 1.3. Similarly, ratio "7"means either 0.3 or 1.7, which is far away from 1.0).

The three re-decoding processes are illustrated as follows:

(a) The width data for the first character re-decoding are:

566  76  294  388  200  128 which results in an edge-to-edge decode of "4252", an invalid code in the previous attempt. The decode technique of the present invention is to divide the bars and spaces width data by the one-module bar width (173) and one module space width (120), respectively. This results in the numbers 3.27  0.63  1.70  3.23  1.16  1.09 which are rounded to 3  1  2  3  1  1 or a $t_1t_2t_3t_4$ value of "4354", which corresponds in the table of code 128 values to "58". The success of this re-decode can be checked following the method described below.

(b) The width data for the second character re-decoding are:

171  157  522  214  334  261 which results in an edge-to-edge decode of "2554", a table value of "100". However, code word "100" has 8 bar modules and 3 space modules, so $$1X \text{ bar} = \frac{171 + 522 + 334}{8} = \frac{1027}{8} = 128.37$$

$$1X \text{ space} = \frac{157 + 214 + 216}{3} = \frac{632}{3} = 210.67$$

Testing these values, we find:

bars: $\frac{128.37}{173} = 0.74$ (far less than 1.0)

space: $\frac{210.67}{120} = 1.67$ (far greater than 1.0)

and declare a mis-decode. This mis-decode would not have been caught by the standard edge-to-edge technique. To re-decode, divide widths by standard 1X modules for bars and spaces.

$$\frac{171}{173} \quad \frac{157}{120} \quad \frac{522}{173} \quad \frac{214}{120} \quad \frac{334}{173} \quad \frac{261}{120}$$

which equals 0.99  1.31  3.02  1.78  1.93  2.17 which rounds to:

1  1  3  2  2  2 or a $t_1t_2t_3t_4$ value of "2454" and a code word "15". Code word "15" has 6 bar modules and 5 space modules, so $$1X \text{ bar} = \frac{1027}{6} = 171.17$$

$$1X \text{ space} = \frac{632}{5} = 126.40$$

Testing the ratios bars: $\frac{171.17}{173} = 0.99$ (close to 1.0)

spaces: $\frac{126.40}{120} = 1.05$ (close to 1.0)

and the decode is successful.

(c) The width data for the third character re-decoding are:

211  101  564  76  702  77 which results in an edge-to-edge decode of "2445", which is code word "99".

Testing the bar and space ratios, $$1X \text{ bar} = \frac{1477}{8} = 184.63$$

$$1X \text{ space} = \frac{254}{3} = 84.67$$

bars: $\frac{184.63}{173} = 1.07$ spaces: $\frac{84.67}{120} = 0.71$ (may be a mis-decode)

the re-decode proceeds as follows. The ratios are:

$$\frac{211}{173} \quad \frac{101}{120} \quad \frac{564}{173} \quad \frac{76}{120} \quad \frac{702}{173} \quad \frac{77}{120}$$

which equals 1.22  0.84  3.26  0.63  4.06  0.64 which rounds to 1  1  3  1  4  1 which results in the same "2445" result as that produced by the edge-to-edge technique. Since the new decoded character does not produce better ratio, we thus accept the code word "99" as valid.

In the re-decoded characters, the summation of the rounded integers is exactly 11, which is correct.

| | | | | | | |
|---|---|---|---|---|---|---|
| (In example (a)): | 3 | 1 | 2 | 3 | 1 | 1 | (sum = 11) |
| (In example (b)): | 1 | 1 | 3 | 2 | 2 | 2 | (sum = 11) |
| (In example (c)): | 1 | 1 | 3 | 1 | 4 | 1 | (sum = 11) |

However, if the bar code signal is badly distorted, the sum may not be the proper sum of 11. Instead, it can be 9,10,12,13, etc. The next example illustrates this problem.

The method is used to attempt to re-decode character with $X_B=96$ and $X_S=87$, and width data of:

76  80  339  57  385  75 divide by 1X bar (space)

$$\frac{76}{96} \quad \frac{80}{87} \quad \frac{339}{96} \quad \frac{57}{87} \quad \frac{385}{96} \quad \frac{75}{87}$$

0.79  0.92  3.53  0.66  4.01  0.86  confidences rounded to the closest integer 1  1  4  1  4  1   (sum = 12, sum ≠ 11!)

Since a proper sum of modules for code 128 is 11, one bar or space should be decreased by 1 module. In order to locate the bad element (or elements), we need to narrow the search space to reduce the possibility of a false hit. Note that the confidence of an element is defined as the ratio of the element width to its corresponding average 1X width. The closer a ratio is to an integer, the higher confidence the element. We narrow the search space as follows:

(1) For Code 128, sum of bar modules is always even and sum of space modules is always odd. So sum of bar modules =1+4+4=9, not even. This tells us to reduce some of the bars.

This step does not yield positive result if there are two bars (spaces) missing or two extra bars (spaces).

(2) Taking into account that the widest element has four modules, the confidence of each element can be adjusted, according to the following rules:
   (1) If module is 0, then set module to 1 and confidence to 1.00.
   (2) If module is 1, and the confidence is less than 1.00, then set confidence to 1.00. Otherwise, do not adjust.
   (3) If module is 4, and the confidence is greater than 4.00, then set confidence to 4.00. Otherwise, do not adjust.
   (4) If modules is greater than 4, set the module to 4 and set confidence to 4.00.

The above rules may be easily understood as follows:

|     | Confidence | module |   |   |
|-----|------------|--------|---|---|
| (1) | 0.4 | → | 0 | If we see some bar, it must be at least 1X and it cannot be anything else. Set the confidence to 1.00 (highest confidence) so the element cannot be adjusted later. |
| (2) | 0.8 | → | 1 | Cannot be 2. Set the highest confidence 1.00 so the element can not be adjusted later |
|     | 1.45 | → | 1 | May be adjusted to 2 later so do not change confidence |
| (3) | 3.55 | → | 4 | May be adjusted to 3 later, so do not change confidence |
|     | 4.2 | → | 4 | Cannot be 3 or 5. Set the highest confidence to 4.00 so the element cannot be adjusted later |
| (4) | 4.9 | → | 5 | There are only 4 modules. Set to 4.00 so the element cannot be adjusted later. |

Confidence adjustment in step (2) can be extended to further reduce the search space if step (1) produces a positive result. For example, if we know that space modules do not have any problem but bar modules have some problem, then we set all the confidence values of space modules to the highest level so that the space modules won't be adjusted later.

|        | 0.79 | 0.92 | 3.53 | 0.66 | 4.01 | 0.86 | original confidences |
|--------|------|------|------|------|------|------|----------------------|
| round: | 1    | 1    | 4    | 1    | 4    | 1    | modules              |
| adjust | 1.00 | 1.00 | 3.53 | 1.00 | 4.0  | 1.00 | new confidences      |

By searching for the element corresponding to the lowest confidence value (3.53, whose fractional part 0.53 is far from its neighboring integers 0 and 1), we conclude that the third element should be reduced.

(3) Verify the feasible direction of adjustment.
3.53
Fraction part
0.53>0.5

This means its corresponding module was rounded up to 4 and may have possibly introduced one extra module. Therefore it can be reduced by 1. However, if the fraction part was less than 0.5, then the module was rounded down and can not be further reduced here.

By combining step (1), (2), (3), the elements after the adjustment look like:

$$\begin{array}{cccccc} 1 & 1 & 3 & 1 & 4 & 1 \\ r_1\,r_2\,r_3\,r_4 = 2445 & & \text{value: "99} \end{array} \quad (\text{sum}=11)$$

Now check ratio to verify the correct decode:

$$1X\,\text{bar} = \frac{800}{8} = 100.00$$

$$1X\,\text{space} = \frac{212}{3} = 70.67$$

ratio of bar: $\frac{100.00}{96} = 1.04$ (close to 1.00)

ratio of space: $\frac{70.67}{87} = 0.81$ (fairly close to 1.00)

The decode result is accepted since the character is previously marked as non-decodable.

It is clear that multiple elements can be adjusted by looking for the elements with lowest confidences.

Figure 3:
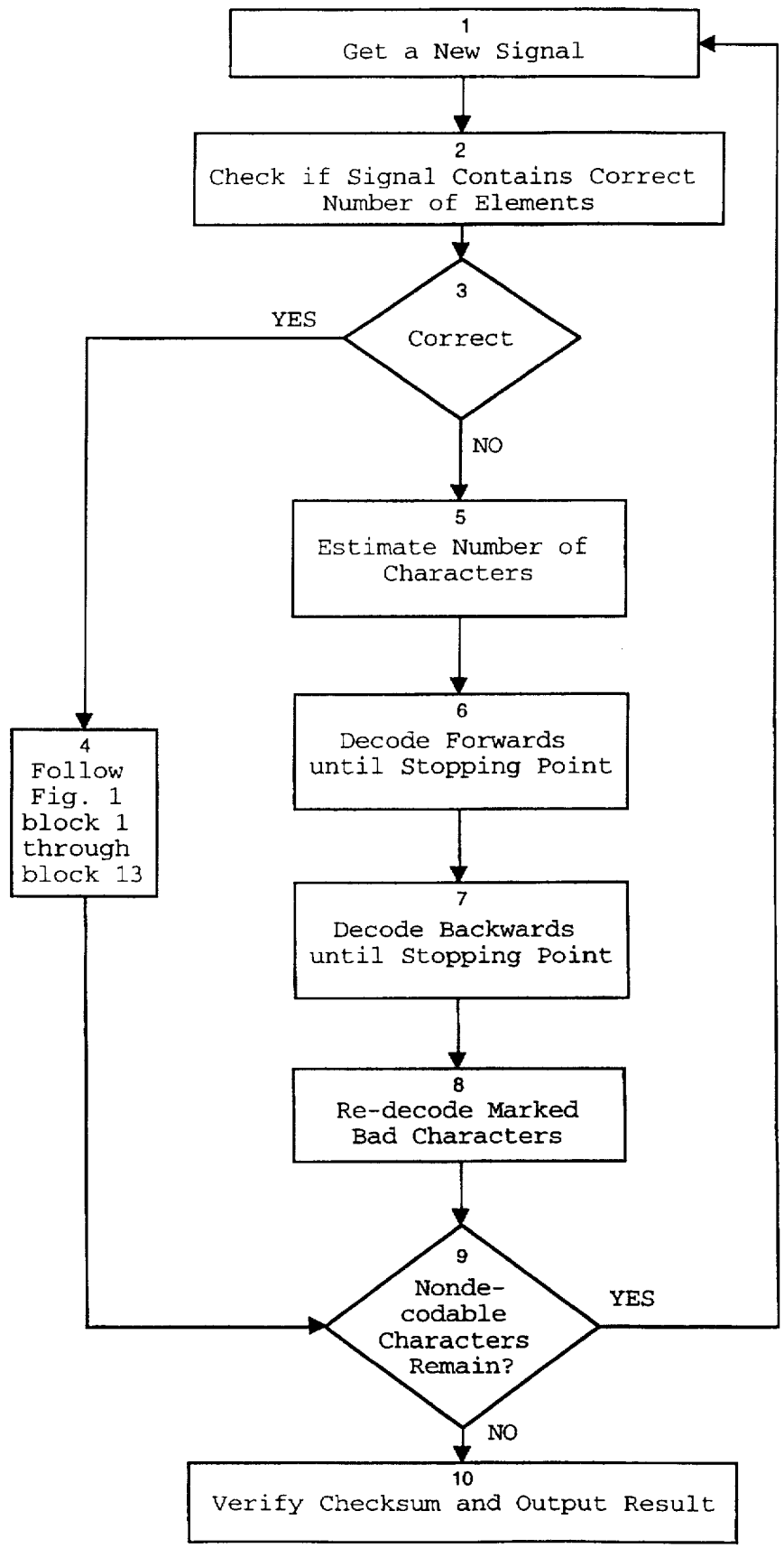
FIG. 3 is a flow chart of an embodiment of the present invention illustrating how to use the present invention to enable the stitching together of two fragments of a bar code.

The usefulness of the character ratio is dependent on the correct segmentation of a bar code scan signal. If a bar or space is not detected from the scan signal, or if the bar code signal is contaminated by noise (such as might occur with marks over the bar code) then the characters decoded after the bad area is encountered will have bad ratios (if they are decoded) and are in general useless. A useful strategy is to check to see if the scan signal contains correct number of elements. For example for code 128, the number of elements of a correctly segmented scan pass modulo 6 should be equal to 1. If a scan pass is correctly segmented, then it is decoded in the normal fashion (from begin to end). Otherwise, it is decoded until a stopping point is detected, and then decoded backwards to the same stopping point. The stopping point is defined as the character from which two consecutive characters are marked as a bad character (i.e., either non-decodable or mis-decoded). At least one of the bad characters has missing (or extra) element(s) and cannot be decoded even after the re-decode process. A new scan signal is acquired and all the characters are decoded again. A decoded character replaces its previous result only if it has a better ratio. If the new signal has a different stopping point, then the bar code is possible to be decoded. The process is illustrated in FIG. 3.

We may summarize this embodiment as a new technique consisting of the following steps:

1. Decode an initialization (i.e., start or stop) character and establish an initial estimate of 1X bar and space.

2. Use standard decoding technique to decode the rest. If a character is decoded and the ratios are close to 1.0, then the 1X bar and space modules are used to update the running average values of 1X bar and space. Otherwise, the character is marked to be re-decoded later.

3. After attempting to decode all the characters, final running averages of values 1X bar and 1X space are obtained.

4. The marked, previously non-decodable or mis-decoded characters are re-decoded. A re-decoded value is accepted only if it produces a better ratio (close to 1) than the previously decoded value.

The invention may be implemented with any of a number of devices for acquiring and processing a signal representative of a scan of a bar code. As shown in FIG. 4, the major components of the invention are a CCD camera or laser scanner 11, an signal processing module 21, which can be plugged into a PC 31, and a storage device 41. The controller may have a keyboard 51 or other control device (not shown) to facilitate operation of the invention. The signal processing module 21 measures the widths of the bars and spaces and provides numbers representative of those widths to the processor residing in module 21, or the processor of the PC 31, by methods well known to those skilled in the art. The method is programmed into the processor, and the storage device 41 is used to store intermediate and final results, if necessary or desired for the particular application. Programmers of ordinary skill in the art will be able to write programs for carrying out the disclosed method based on the description of the method contained herein.

Referring to the nomenclature of this specification, the detailed description is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

While this invention has been described in detail with particular reference to preferred embodiments thereof, it will be understood that variations and modifications can be made to these embodiments without departing from the spirit and scope of the invention as described herein and as defined in the appended claims.

I claim:

1. A method of decoding characters of a bar code including a start code and a stop code, each character of the bar code being represented by a series of elements comprising bars and spaces, a width of each such element being a multiple of a unit bar module width or a unit space module width, comprising the steps of:

(a) scanning a bar code and assigning a value to the width of each element encountered in the scan;

(b) decoding a start or stop character of the bar code;

(c) calculating a first average unit bar module width by dividing a sum of the bar widths of the start or stop character by a known number of bar unit modules in the start or stop character;

(d) calculating a first average unit space module width by dividing the sum of the space widths of the start or stop character by a known number of space unit modules in the start or stop character;

(e) attempting to decode a second character of the bar code;

(f) if said attempt to decode said second character fails, marking said second character as non-decodable;

(g) if said attempt to decode said second character succeeds, calculating a second average unit bar module width by dividing the sum of the bar widths of the second character by a known number of bar unit modules in the second character, and continuing with steps (h)–(j);

(h) calculating a second average unit space module width by dividing the sum of the space widths of the second character by a known number of space unit modules in the second character;

(i) accepting the decoding of said second character if a ratio of the second to the first average unit bar module widths is within a predetermined tolerance of 1:1, and a ratio of the second to the first average unit space module widths is within a predetermined tolerance of 1:1; and marking said second character as mis-decoded if said ratios are outside said predetermined tolerance.

2. The method of claim 1, further comprising the steps of:

(k) if the decoding of said second character is accepted, calculating a running average of the first and second average unit bar module widths and a running average of the first and second average unit space module widths;

(l) decoding a third character of the bar code;

(m) if said attempt to decode said third character fails, marking said third character as non-decodable;

(n) if said attempt to decode said third character succeeds, calculating a third average unit bar module width by dividing the sum of the bar widths of the third character by a known number of bar unit modules in the third character, and continuing with steps (o)–(r);

(o) calculating a third average unit space module width by dividing the sum of the space widths of the third character by a known number of space unit modules in the third character;

(p) accepting the decoding of said third character if the ratio of the third average unit bar module width to the running average unit bar module width is within a predetermined tolerance of 1:1, and the ratio of the third average unit space module width to the running average unit space module width is within a predetermined tolerance of 1:1;

(q) marking said third character as mis-decoded if said third-to-running ratios are outside said predetermined tolerance; and (r) if the decoding of said third character is accepted, calculating an updated running average of the third and running average unit bar module widths and an updated running average of the third and running average unit space module widths.

3. The method of claim 1, further comprising repeating steps (l)–(r) for a fourth and all subsequent characters in said bar code, resulting in accepted, mis-decoded, and non-decodable characters and a final running average unit bar module width and a final running average unit space module width.

4. The method of claim 3, further comprising re-decoding one of said marked non-decodable or mis-decoded characters by:

(s) dividing the width of each bar element by the final running average unit bar module width, and the width of each space element by the final running average unit space module width, to obtain a series of quotients;

(t) rounding the quotients obtained in step (s) to a closest integer;

(u) decoding the series of integers of step (t) to obtain a new character;

(v) calculating a new character average unit bar module width by dividing the sum of the bar widths of said one character by a known number of bar unit modules in the new character;

(w) calculating a new character average unit space module width by dividing the sum of the space widths of said one character by a known number of space unit modules in the new character;

(x) accepting the decoding of said one character as the new character if the ratio of the new character average unit bar module width to final running average unit bar module width is within a predetermined tolerance of 1:1, and the ratio of the new character average unit space module width to final average unit space module width is within a predetermined tolerance of 1:1.

5. The method of claim 4, further comprising, if the new character decoded from said series of integers in step (u) is the same as the previously decoded non-accepted character, accepting said character.

6. The method of claim 4, further comprising, prior to decoding the new character in step (u), determining whether the sum of said series of integers equals a known total number of modules in said new character.

7. The method of claim 3, comprising:

decoding one of a start code or stop code in step (b);

repeating steps (l)–(r) until encountering a bad area meeting predetermined criteria prior to encountering the other of the start code or stop code;

decoding the other of the start code or stop code at the opposite end of the bar code; and repeating steps (l)–(r) from the other of the start code or stop code toward the bad area.

8. A method of decoding a bar code of a particular kind, wherein the bar code is comprised of a number of characters in an order, each character of which is represented by a series of elements of a plurality of types, the width of each element in the series being in one of a plurality of fixed ratios to a unit module width corresponding to the element type, the plurality of fixed ratios being determined by a particular kind of a bar code, comprising the steps of:

(a) scanning the bar code and assigning a value to the width of each element encountered in the scan;

(b) grouping the width values into ordered sets corresponding to the order of the characters in the bar code;

(c) finding an initialization character among the ordered sets resulting from step (b) above;

(d) determining the particular kind of the bar code;

(e) determining an average unit module width corresponding to each element type;

(f) comparing the width values in the ordered set next in order to a table of standard character values for the particular kind of bar code; and;

(f)(i) if no match is found, marking the ordered set as non-decodable;

(f)(ii) if a match is found, subjecting the width values in the ordered set to ratio analysis, and;

if the ratio analysis is unsuccessful, marking the ordered set as mis-decoded; and if the ratio analysis is successful, updating the average unit module width corresponding to each element type; and (g) re-decoding the marked characters by applying a standard decoding method to a series of integers derived from the widths of the elements of the marked character divided by the appropriate average unit module width.

9. A method of decoding a bar code according to claim 8, wherein said ratio analysis comprises the steps of:

(h) computing a current unit module width based on the next ordered set;

(i) comparing the current unit module width with the average unit module width;

(j) declaring a successful ratio analysis if the result of the comparison in step (i) above is approximately a 1:1 ratio.

10. A method of decoding a bar code according to claim 9, wherein at least one ordered set is marked as non-decodable or mis-decoded, all of such sets so marked being called marked sets, further comprising the steps of:

(k) dividing the width values for each of the elements in a marked set by the average unit module width corresponding to the element type;

(l) rounding the quotients obtained in step (k) to a closest integer value;

(m) adjusting said integer values to make the sum of said integer values equal a known number of modules in a character represented by said marked set.

11. A method of decoding a bar code according to claim 10, wherein said step (m) of adjusting said integer values comprises the steps of:

(n) summing the integers determined in step (l) above for the marked set;

(o) determining if the sum obtained in step (n) above is a proper sum for the kind of bar code; and (p) if not, selecting an element by a confidence analysis and adjusting the number of unit modules in the selected element according to the result of the confidence analysis.

12. A method of decoding a bar code according to claim 11, wherein said confidence analysis comprises the steps of:

(q) determine whether a unique parity for bars is satisfied by the integer values determined in step (l), and, if so, set a high confidence value to prevent adjustment of the number of bar elements;

(r) determine whether a unique parity for spaces is satisfied by the integer values determined in step (l), and, if so, set a high confidence value to prevent adjustment of the number of space elements;

(s) if the bar code is a multi-width bar code, set a high confidence level for extreme elements of the bar code;

(t) for the element with the least confidence value, increment the module number if the module number was previously rounded down, and decrement the module number if the module number was previously rounded up; and (u) if the module number is not adjusted in step (t), apply the method of step (t) to next element with higher confidence until step (o) above is satisfied or until the module numbers of all the elements have been adjusted.

13. A computing device having executable instructions for decoding characters of a bar code including a start code and a stop code, each character of the bar code being represented by a series of elements comprising bars and spaces, the width of each such element being a multiple of a unit bar module width or a unit space module width, according to the steps of:

(a) scanning a bar code and assigning a value to the width of each element encountered in the scan;

(b) decoding a start or stop character of the bar code;

(c) calculating a first average unit bar module width by dividing a sum of the bar widths of the start or stop character by a known number of bar unit modules in the start or stop character;

(d) calculating a first average unit space module width by dividing a sum of the space widths of the start or stop character by a known number of space unit modules in the start or stop character;

(e) attempting to decode a second character of the bar code;

(f) if said attempt to decode said second character fails, marking said second character as non-decodable;

(g) if said attempt to decode said second character succeeds, calculating a second average unit bar module width by dividing the sum of the bar widths of the second character by a known number of bar unit modules in the second character, and continuing with steps (h)–(j);

(h) calculating a second average unit space module width by dividing the sum of the space widths of the second character by a known number of space unit modules in the second character;

(i) accepting the decoding of said second character if the ratio of the second to the first average unit bar module widths is within a predetermined tolerance of 1:1, and the ratio of the second to the first average unit space module widths is within a predetermined tolerance of 1:1; and (j) marking said second character as mis-decoded if said ratios are outside said predetermined tolerance.

14. The computing device of claim 13, having further executable instructions for decoding characters according to the steps of:

(k) if the decoding of said second character is accepted, calculating a running average of the first and second average unit bar module widths and a running average of the first and second average unit space module widths;

(l) decoding a third character of the bar code;

(m) if said attempt to decode said third character fails, marking said third character as non-decodable;

(n) if said attempt to decode said third character succeeds, calculating a third average unit bar module width by dividing the sum of the bar widths of the third character by a known number of bar unit modules in the third character, and continuing with steps (o)–(r);

(o) calculating a third average unit space module width by dividing the sum of the space widths of the third character by a known number of space unit modules in the third character;

(p) accepting the decoding of said third character if the ratio of the third average unit bar module width to the running average unit bar module width is within a predetermined tolerance of 1:1, and the ratio of the third average unit space module width to the running average unit space module width is within a predetermined tolerance of 1:1;

(q) marking said third character as mis-decoded if said third-to-running ratios are outside said predetermined tolerance; and (r) if the decoding of said third character is accepted, calculating an updated running average of the third and running average unit bar module widths and an updated running average of the third and running average unit space module widths.

15. The computing device of claim 14, having further executable instructions for decoding characters according to the steps of:

repeating steps (l)–(r) for a fourth and all subsequent characters in said bar code, resulting in accepted, mis-decoded, and non-decodable characters and a final running average unit bar module width and a final running average unit space module width.

* * * * *